United States Patent [19]

Miller et al.

[11] 4,151,802

[45] May 1, 1979

[54] BOTTOM RAIL CONSTRUCTION

[75] Inventors: Frank J. Miller; Mikito Fujii, both of Warren; Hem R. Vij, Fraser, all of Mich.

[73] Assignee: Fruehauf Corporation, Detroit, Mich.

[21] Appl. No.: 832,734

[22] Filed: Sep. 12, 1977

[51] Int. Cl.² .............................................. B61D 17/18
[52] U.S. Cl. ..................................... 105/423; 296/183
[58] Field of Search .......................... 296/24 B, 28 M; 105/357, 404, 409, 423, 424, 376, 401; 52/480, 481, 578, 579, 619, 620, 143

[56] References Cited

U.S. PATENT DOCUMENTS 3,230,680  1/1966  Jarreby ........................ 52/61 B X
3,393,920  7/1968  Ehrlich ........................ 296/28 M X

*Primary Examiner*—Joseph F. Peters, Jr.
*Assistant Examiner*—Gene A. Church
*Attorney, Agent, or Firm*—Harness, Dickey & Pierce

[57] ABSTRACT

The disclosure relates to a load bearing, post-free sidewall for an over-the-road trailer or the like. A bottom rail of the sidewall is attached to the floor of the trailer and secures the sidewall thereto. Each of the sidewalls comprises a pair of substantially parallel, vertically extending, horizontally spaced and load bearing plastic panels having foam insulation disposed therebetween. The bottom rail member transfers loads thereon substantially equally to each of the panels of each sidewall.

3 Claims, 3 Drawing Figures

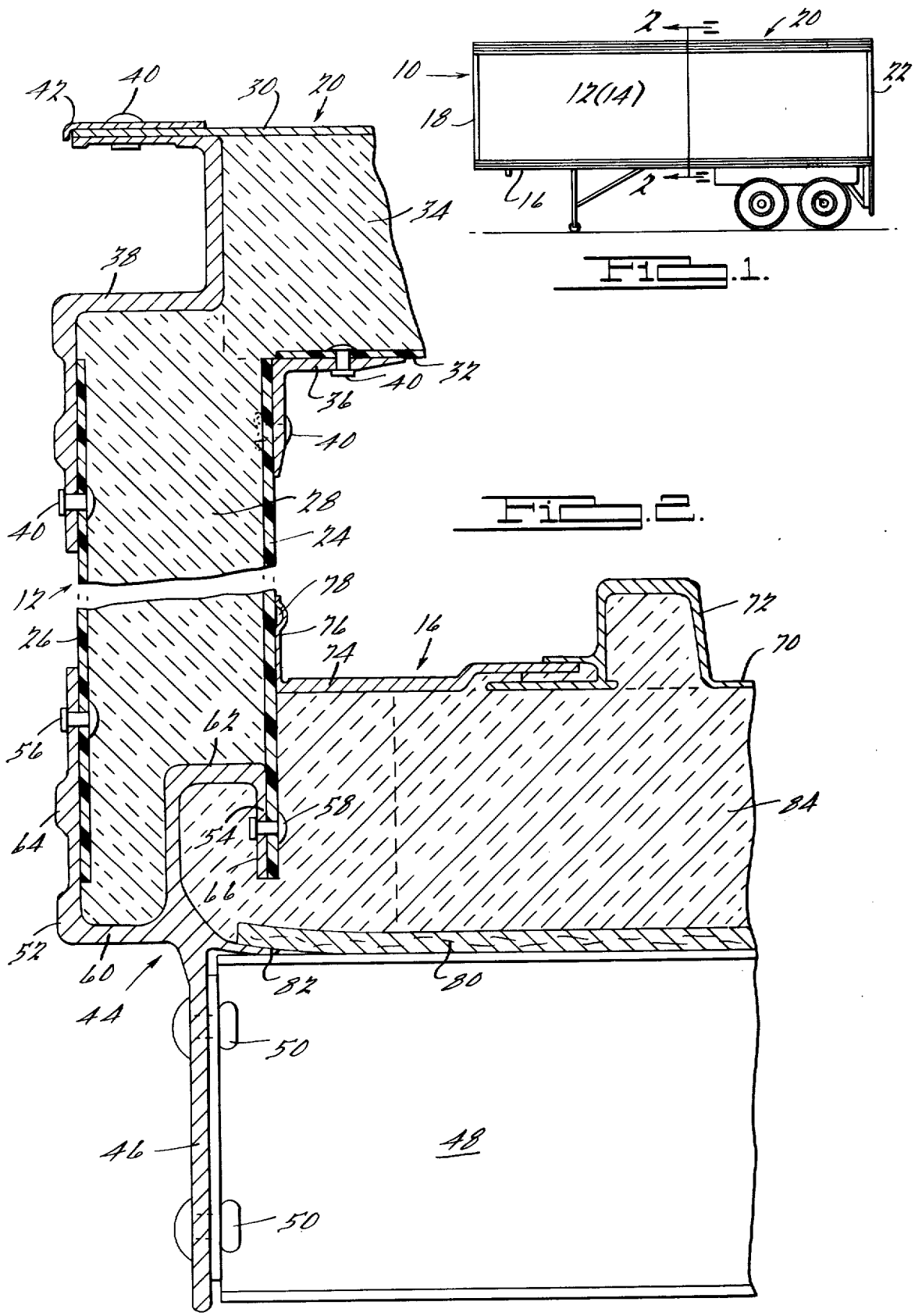

BOTTOM RAIL CONSTRUCTION

BACKGROUND AND SUMMARY OF THE INVENTION

The sidewall members, roof members and floor members of trailers and other over-the-road vehicles are constructed so as to distribute and carry the loads normally carried by such vehicles. All joints and connecting assemblies between the sidewalls, roof members and floor members have to be carefully constructed to prevent uneven load distribution and the establishment of uneven bending moments which might cause buckling and distortion of the sidewalls.

The structural problem relative to the wall, roof and floor construction, as well as the joint assemblies, are more acute when the trailer is a refrigerator trailer and the walls, roof and floor members are insulated with various components which are generally incapable of supporting substantial weight or handling uneven weight distribution or bending moments. In the event that such refrigerated vehicles have post-free walls comprised of relatively thin inner and outer plastic panels with insulating foam therebetween, the walls must carry loads without the support normally offered by posts. In such a situation the configuration of the bottom rail of the wall is critical.

Accordingly, the broad object of the present invention is an improved sidewall construction for over-the-road trailers and other vehicles, especially refrigerator trailers.

Another object of the present invention is an improved bottom rail construction having a stress transfer relationship with its associated sidewall components that exhibits an evenly balanced bending moment on the connection between inner and outer panels of the sidewall and the bottom rail.

A further object of one embodiment of the present invention is to provide an improved bottom rail construction which permits conventional riveting from one side of the sidewall members.

The aforesaid objects are achieved by means of an improved bottom rail that is attached to the floor of the trailer and secures load-bearing, post-free sidewalls thereto. Each of the sidewalls comprises a pair of substantially parallel, vertically extending, horizontally spaced load-bearing, plastic panels. Foam insulation is injected between the panels forming the sidewalls. The bottom rail has a vertical flange for attachment to the floor which lies between the wall panels. A pair of L-shaped flanges are positioned on opposite sides of the vertical flange, each of which is attached to one of the sidewall panels. The horizontal portions of the L-shaped flanges are of substantially equal dimension so as to transmit loads substantially equally to the spaced sidewall panels thereby to apply substantially equal bending moments to the sidewall panels.

Further objects, features and advantages of the present invention will become apparent from the following description viewed in accordance with the accompanying drawings.

BRIEF DESCRIPTION OF THE DRAWINGS

FIG. 1 illustrates a refirgerator trailer utilizing the present invention;

FIG. 2 is a cross-sectional view of a bottom rail construction in accordance with the present invention viewed in the direction of the arrows 2—2 of FIG. 1.

DESCRIPTION OF THE PREFERRED EMBODIMENTS

Figure 3:
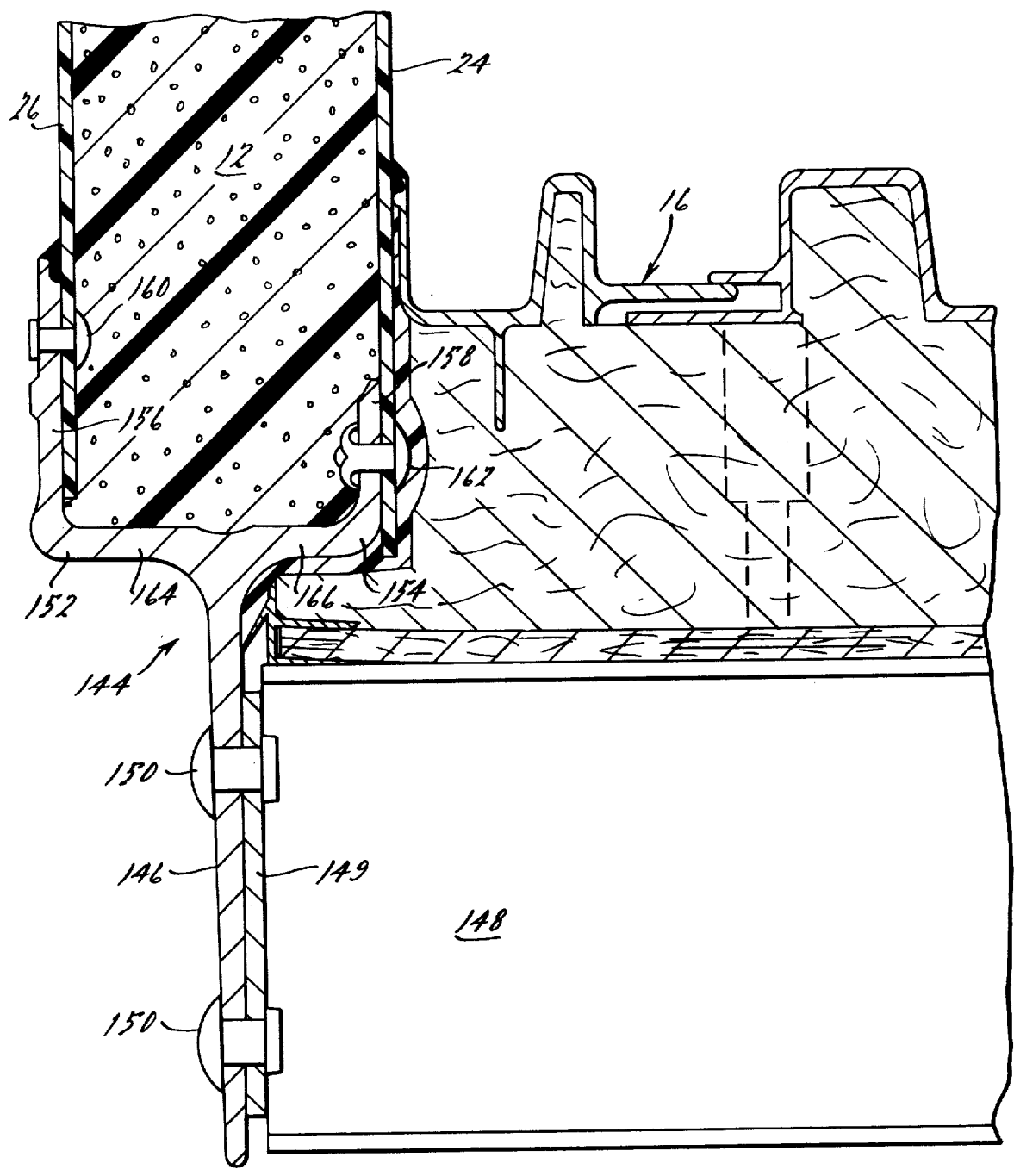
FIG. 3 is a view, similar to FIG. 2, of a modified bottom rail.

FIG. 1 illustrates an over-the-road refrigerator trailer 10 comprising a pair of sidewalls 12, a floor 16, a front wall 18, a roof 20, and a rear wall 22. One or more doors may be provided in one or more of the sidewall members 12 or the rear wall 22. A refrigerator unit (not shown) is often attached to the front wall 18 of the trailer 10 to keep the inside thereof at a specified temperature.

As shown in FIG. 2, the sidewall 12 comprises a plastic inner skin or panel 24, a plastic outer skin or panel 26, and a layer of insulating foam 28 sandwiched therebetween. The inner and outer panels 24 and 26 typically comprise relatively thin (on the order of ⅛ of an inch) sheets of fiberglass reinforced plastic and are positioned in substantially parallel, horizontally spaced relationship. The panels 24 and 26 extend vertically and, when assembled, form a sidewall 12 that is post-free. The foam 28 bonds securely to the panels 24 and 26 forming a relatively lightweight, insulating, load-bearing sidewall.

Similarly, the roof member 20 comprises an outer skin 30, an inner skin 32, with a layer of insulating foam 34 sandwiched therebetween. The sidewalls 12 are joined to the roof member 20 by means of inner top rails 36 and outer top rails 38. The rails 36 are attached to the inner panel 24 of the sidewalls 12 and the inner panel 32 of the roof member 20 by conventional means, such as rivets 40.

The top rail 38 connects the outer panel 26 of the sidewalls 12 to the outer skin 30 of the roof member 20.

Since the sidewalls 12 are post-free; that is, they are comprised solely of the inner and outer plastic panels 24 and 26 held firmly together in parallel spaced-apart relationship by the foam 28, care must be taken to minimize bending moments applied thereto.

In accordance with the instant invention a bottom rail 44 has a downwardly extending flange portion 46 which is attached to transverse supports 48 associated with the floor 16. The floor supports 48 typically comprise I-beams or the like, the flange 46 and thus the bottom rail 44 being attached thereto by conventional means, such as rivets 50. The vertically downward extending flange 46 is positioned such that it lies in a plane between the wall panels 24 and 26 of the sidewalls 12, 14 and preferably is positioned substantially midway between them.

The bottom rail 44 has a pair of upwardly extending, generally L-shaped flanges 52 and 54 on opposite sides of the downwardly extending flange 46. The L-shaped flanges 52 and 54 extend in opposite directions to facilitate riveting of the wall panels 24 and 26 to the bottom rail 44. With this construction, conventional riveting techniques can be used to attach the sidewalls 12 to the floor 16 and the riveting of both panels 24 and 26 can be carried out from the same side. During assembly, the outer wall panel 26 is first attached to the flange 52 of the bottom rail member 44 by conventional riveting means, such as rivets 56. Thereafter, the inner panel 24 is attached to flange 54, again by conventional riveting techniques. Foam 28 is injected between the panels 24 and 26 forming the completed sidewall 12. In this embodiment, the use of blind rivets is obviated and the use of less expensive and often more reliable squeeze-type rivets is facilitated.

It is to be noted that the L-shaped flanges 52 and 54 are positioned on opposite sides of the vertical flange and have horizontal portions 60 and 62, respectively, which are of substantially equal length. In this manner, the bending moments created by downward deflections of the bottom rail member as a result of loads on the floor 16 are transmitted substantially equally to the panels 24 and 26. Thus, the sidewalls 12 are not subjected to bending moments which might cause them to buckle or deform. The L-shaped flanges 52 and 54 also have vertically extending portions 64 and 66, respectively, for attachment to the wall panels 24 and 26 as described above.

The floor 16 includes an upper floor panel 70 which has a plurality of generally parallel and equally-spaced structural ribs 72 thereon for supporting the loads normally carried by the trailer 10. An edge close-out 74 is positioned between the floor panel 70 and the panel 24 of the sidewall 12 which is of generally L-shaped cross-section and has a small recess 78 on the upwardly extending vertical leg 76 thereof for the acceptance of a sealing compound or element. A bottom panel 80 of the floor 16 comprises a panel of wood which rests on and is attached to the transverse floor support members 48.

The bottom rail 44 has a small flange 82 thereon which projects inwardly and is positioned between the members 48 and panel 80 to form an overlapping close-out therebetween. An insulating layer of foam 84 is injected between the floor panels 70 and 80 to form the finished floor 16.

Referring to FIG. 3, a modified bottom rail 144 has a downwardly extending flange portion 146 which is attached to transverse support members 148. The floor support members 148 typically comprise I-beams or the like having an end plate 149 welded thereto. The flange 146 of the bottom rail 144 is attached to the plate 149 as by rivets 150. The downwardly extending flange 146 is positioned so as to lie in a plane between the wall panels 24 and 26 of the sidewalls 12, and preferably is positioned substantially midway between them.

The bottom rail 144 has a pair of generally L-shaped flanges 152 and 154 on opposite sides of the downwardly extending flange 146, leg portions 156 and 158 of which extend upwardly for the acceptance of rivets 160 and 162 which secure the wall 12 to the rail 144.

During assembly, the outer wall panel 26 is first attached to the flange 156 of the bottom rail 144 by conventional rivets 160. Thereafter, the inner panel 24 is attached to flange 158, by a blind rivet 162. Thereafter, foam is injected between the panels 24 and 26 forming the completed sidewall 12.

The L-shaped flanges 152 and 154 are positioned on opposite sides of the vertical flange 146 the horizontal portions 164 and 166 thereof, respectively, being of substantially equal length. In this manner, bending of the bottom rail member as a result of a load on the trailer floor member 16 is transmitted substantially equally to the panels 24 and 26. Thus, the panels 24 and 26 of the sidewalls 12 are not subjected to uneven loading or bending moments which might cause them to buckle or rupture the bond between the foam 28 and the panels 24 and 26.

While it will be apparent that the invention herein disclosed is well calcualted to achieve the benefits and advantages as hereinabove set forth, it will be appreciated that the invention is susceptible to modification, variation and change without departing from the spirit thereof.

What is claimed:

1. A load bearing, post-free sidewall construction for a vehicle having transverse cross members for the support of a floor, said sidewall construction comprising
    inner and outer planar, parallel, vertically extending, horizontally-spaced, load bearing sidewall panels,
    insulating means between said panels, and
    a bottom rail for securing said panels in spaced relationship and for transmitting loads on said bottom rail substantially equally to said spaced wall panels comprising a downwardly extending vertical flange for attachment to the vehicle cross members, said flange lying in a plane between said wall panels, and a pair of upwardly extending L-shaped flanges on opposite sides of the vertical flange having horizontal portions of substantially equal dimension and vertical portions for attachment to said wall panels whereby load transfer from said bottom rail to said wall panels is substantially equal.

2. A load bearing sidewall construction in accordance with claim 1, wherein the vertical portions of the L-shaped flanges on said bottom rail extend in opposite directions.

3. A bottom rail member for connecting a sidewall of an over-the-road trailer or the like, to a floor member thereof, said sidewall having load bearing inner and outer plastic panels and a center portion of insulating means, bonded thereto the bottom rail member comprising
    a downwardly extending vertical flange adapted to be connected to said floor member, said vertical flange lying in a plane extending parallel to and between said inner and outer sidewall panels,
    a pair of L-shaped flanges positioned on opposite sides of vertical flange and having substantially equal horizontal portions respectively and vertical portions, said vertical portions adapted to be connected to said inner and outer sidewall panels and said horizontal portions being connected to said vertical flange whereby the bending moment of said bottom rail member on said sidewall panels is substantially equal.

* * * * *